United States Patent
Kanai

(10) Patent No.: US 8,302,507 B2
(45) Date of Patent: Nov. 6, 2012

(54) WAVE GEAR DEVICE

(75) Inventor: Satoru Kanai, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 413 days.

(21) Appl. No.: 12/784,677

(22) Filed: May 21, 2010

(65) Prior Publication Data

US 2010/0319484 A1   Dec. 23, 2010

(30) Foreign Application Priority Data

Jun. 23, 2009  (JP) ................................. 2009-148203

(51) Int. Cl.
   *F16H 35/00*   (2006.01)
   *B23P 15/14*   (2006.01)
   *B23F 15/00*   (2006.01)

(52) U.S. Cl. ...... 74/640; 74/462; 29/893.35; 29/893.36; 409/10

(58) Field of Classification Search .................... 74/640; 29/893.36, 893.35; 409/10
   See application file for complete search history.

(56) References Cited

U.S. PATENT DOCUMENTS

| | | | |
|---|---|---|---|
| 2,906,143 A | 9/1959 | Musser | |
| 5,269,202 A | 12/1993 | Kiyosawa et al. | |
| 5,687,620 A * | 11/1997 | Ishikawa | 74/640 |
| 5,782,143 A | 7/1998 | Ishikawa | |
| 5,918,508 A * | 7/1999 | Ishikawa | 74/640 |
| 6,467,375 B1 * | 10/2002 | Ishikawa | 74/640 |
| 6,526,849 B1 * | 3/2003 | Ishikawa | 74/640 |
| 7,694,607 B2 * | 4/2010 | Ishikawa et al. | 74/640 |
| 7,735,396 B2 * | 6/2010 | Ishikawa et al. | 74/640 |
| 2007/0180947 A1 * | 8/2007 | Ishikawa et al. | 74/640 |
| 2007/0266819 A1 * | 11/2007 | Ishikawa et al. | 74/640 |

FOREIGN PATENT DOCUMENTS

| | | |
|---|---|---|
| JP | 45-41171 | 12/1970 |
| JP | 63-115943 A | 5/1988 |
| JP | 2535503 Y2 | 2/1997 |
| WO | WO 96/19683 A1 | 6/1996 |

* cited by examiner

*Primary Examiner* — Ha D. Ho
*Assistant Examiner* — Valentin Craciun
(74) *Attorney, Agent, or Firm* — Buchanan Ingersoll & Rooney PC

(57) ABSTRACT

A bending state known as "coning," in which the amount of bending of the flexspline gradually decreases in accordance with the distance from the open end of the spline, occurs in cup-type or "silk hat"-type wave gear devices. A tooth profile in which the tooth depth is kept constant and in which the bottom lands and top lands are parallel to each other along the tooth trace direction is used as the basic tooth profile for the circular spline and the flexspline of the wave gear device. A taper surface is formed on a part of the top land near the open end of the flexspline in the basic tooth profile, whereby a modified tooth profile is obtained. The modified tooth profile is employed as the tooth profile for both of the splines. Both of the splines can be caused to mesh together without generating coning-induced interference. Both of the splines can also be subjected to gear cutting by a simple process using a typical machining mechanism.

6 Claims, 5 Drawing Sheets

(a)

(b)

WAVE GEAR DEVICE

TECHNICAL FIELD

The present invention relates to a wave gear device in which a cup-shaped or "silk hat"-shaped flexspline is bent into an elliptical shape to mesh with a circular spline in areas on either end of the major axis of the elliptical shape, and the positions where the two splines are enmeshed are caused to move in a circumferential direction, thereby generating relative rotation between the two splines in accordance with the difference in the number of teeth between the two splines. The present invention more particularly relates to a wave gear device having an external teeth profile and internal teeth profile that makes it possible for the external teeth of the cup-shaped or "silk hat"-shaped flexspline, bent in a state in which the amount of bending gradually increases in a radial direction toward the open end of the flexspline, to mesh with the internal teeth of the circular spline without interference.

BACKGROUND ART

Cup-type wave gear devices having cup-shaped flexsplines, and "silk hat"-type wave gear devices having "silk hat"-shaped flexsplines are two known types of wave gear device. The basic tooth profile for the circular splines and flexsplines in these wave gear devices is defined by straight lines (Patent Document 1: U.S. Pat. No. 2,906,143), but an involute tooth profile has also been proposed (Patent Document 2: JPB S45-41171). There has also been proposed a method in which the tooth profile of the top lands of both of the splines is determined by a curve obtained by the similarity transformation, performed at a reduction ratio of ½, of the required range for the trajectory along which the teeth of the flexspline move relative to the circular spline, with the trajectory being based on a rack approximation of the teeth of the splines, and the range starting from the critical point of meshing on the trajectory (Patent Document 3: JPA S63-115943).

Here, when the flexspline bent into an elliptical shape by an elliptically-contoured wave generator in the cup-shaped or "silk hat"-shaped wave gear device, is cut in a manner forming a longitudinal section that includes the major axis of the elliptical shape, a bending state is obtained in which the amount of bending gradually increases in a manner nearly proportionate to the distance from the diaphragm side to the open end side (a bending state is obtained in which the amount of bending gradually decreases in a manner nearly proportionate to the distance from the open end side to the diaphragm side). This three-dimensional bending state is referred to as "coning."

As a result of coning, the tip surfaces of the teeth of one spline end up interfering with the bottom lands of the teeth of the other spline at the open end of the flexspline, and satisfactory meshing cannot be obtained in a case in which the tooth profiles of the two splines are designed so that the teeth have the same depth in the tooth trace direction, as is the case with the teeth employed in typical flat gears.

It has previously been proposed that end relief machining be carried out on the top parts and bottom parts of the external teeth of the flexspline at the open end side thereof so as to cause the teeth to gradually recede in the direction from the circular spline in order to prevent the coning-induced tooth interference. Such a modification of the tooth profile is disclosed, for example, in Patent Document 4 (WO96/19683, FIG. 11) and Patent Document 5 (Japanese Utility Model Registration No. 2535503, FIG. 11).

However, linear machining such as that used for a typical flat gear cannot be used to perform gear cutting on a flexspline having such a modified tooth profile, and a problem is therefore presented in that limitations are imposed on the gear cutting methods that can be used.

DISCLOSURE OF THE INVENTION

In light of the above-mentioned points, it is an object of the present invention to provide a wave gear device having a tooth profile that makes it possible to use a typical machining mechanism for gear cutting and to prevent coning-induced interference.

In order to solve the above-mentioned problems, the wave gear device according to the present invention comprises:

a wave gear device, comprising:

a rigid circular spline having internal teeth formed on a circular inner circumferential surface thereof;

a flexspline disposed inside the circular spline and provided with a cylindrical body capable of bending in a radial direction, a diaphragm having one end contiguous with a rear end of the cylindrical body, a rigid boss formed on another end of the diaphragm, and external teeth formed on an external circumferential part near an open end of the cylindrical body; and a wave generator for bending the cylindrical body of the flexspline into an elliptical shape, causing the external teeth to partially mesh with the internal teeth of the circular spline, causing positions at which both of the sets of teeth are enmeshed to move in a circumferential direction, and generating relative rotation between both of the splines in accordance with a difference in the number of teeth between the two sets of teeth;

wherein the amount of bending in a radial direction at a position along a major axis of the elliptical shape in the cylindrical body bent into an elliptical shape by the wave generator gradually increases in a direction from the rear end to the open end;

wherein the tooth profile of the external teeth is defined by a first modified tooth profile obtained by modifying a first basic tooth profile, the first basic tooth profile has a bottom land and a top land parallel to each other so that a tooth depth thereof is kept constant, and the first modified tooth profile is provided with a first tapered surface in a top land area near a tooth trace end of the first basic tooth profile located on an open end side of the flexspline so that a tooth depth thereof gradually decreases toward an open end of the flexspline along a tooth trace direction thereof;

wherein the tooth profile of the internal teeth is defined by a second modified tooth profile obtained by modifying a second basic tooth profile, the second basic tooth profile has a bottom land and a top land parallel to each other so that a tooth depth thereof is kept constant, and the second modified tooth profile is provided with a second tapered surface in a top land area near a tooth trace end of the second basic tooth profile located on a side of an open end of the flexspline so that a tooth depth thereof gradually decreases toward an open end of the flexspline along a tooth trace direction thereof; and, wherein respective angles of the first and second tapered surfaces formed on the external teeth and the internal teeth, and respective ranges in which the first and second tapered surfaces are formed in the tooth trace direction, are set so that the top land of one set of teeth does not interfere with the bottom land of the other set of teeth in the internal teeth and external teeth that have been brought to an enmeshed state by the wave generator.

The flexspline used in the wave gear device as constituted above can be manufactured by the steps of:

producing a flexspline blank having the cylindrical body, the diaphragm, the boss, and an external-tooth forming part;

performing a tapering process on a part of the external-tooth forming part of the flexspline blank that serves as a top land portion of the external teeth near the open end of the flexspline; and subjecting the external-tooth forming part after the tapering process to gear cutting by linear machining, so that the external teeth having the first modified tooth profile is obtained.

The gear machining can thus be carried out by linear machining in the same manner as in the machining of a typical straight-line flat gear. This makes it possible to cut gears on the flexspline designed to prevent the heretofore problematic coning-induced interference using a wire cutting machine or another typical machining mechanism.

Similarly, the circular spline used in the wave gear device as constituted above can be manufactured by the steps of:

producing an annular circular spline blank having an internal-tooth forming portion on an inner circumferential surface thereof;

performing a tapering process on a part of the internal-tooth forming part of the annular circular spline blank that serves as a top land portion of the internal teeth located on the side of the open end of the flexspline; and subjecting the internal-tooth forming part after the tapering process to gear cutting by linear machining, so that the internal teeth having the second modified tooth profile is obtained.

In this case as well, the internal teeth for preventing interference can be machined using a typical machining mechanism.

EFFECT OF THE INVENTION

In the wave gear device of the present invention, a tooth profile in which the tooth depth is kept constant and in which the bottom land and top land are parallel to each other along the direction of the flank line is used as the basic tooth profile for the circular spline and the flexspline. A taper is formed on a part of the top land at the flank line end near the open end of the spline in this basic tooth profile, whereby a modified tooth profile is obtained. The resulting modified tooth profile is employed as the tooth profile for both of the splines. As a result, both of the splines can be caused to mesh together without generating coning-induced interference. Both of the splines can also be subjected to gear cutting by a simple process using a typical machining mechanism.

EMBODIMENTS FOR CARRYING OUT THE INVENTION

A wave gear device to which the present invention is applied is described below with reference to the accompanying drawings.

Figure 1:
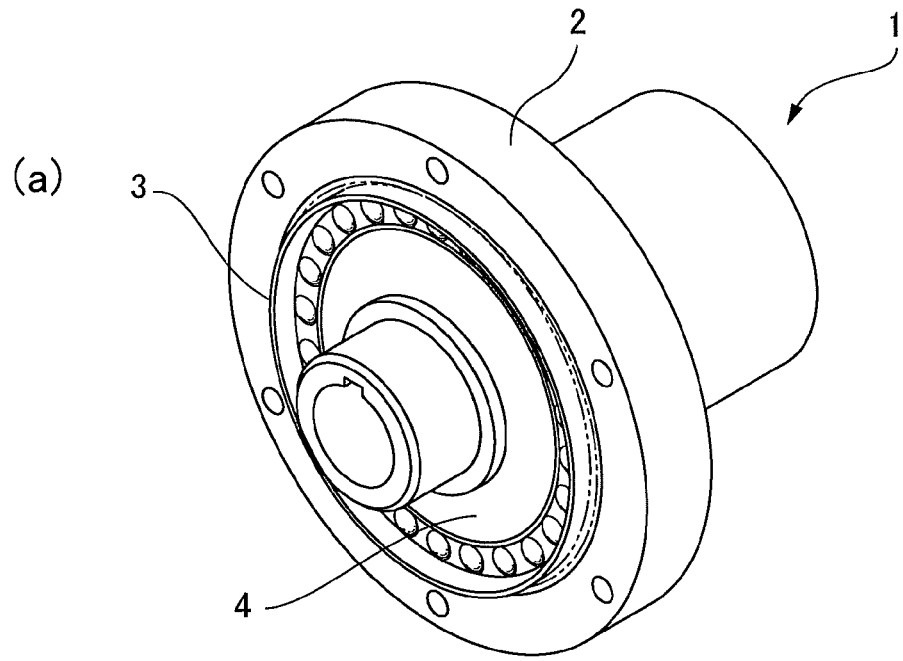
FIG. 1(a) is a perspective view of a cup-type wave gear device to which the present invention is applied, and (b) is a schematic front view thereof.
Figure 1:
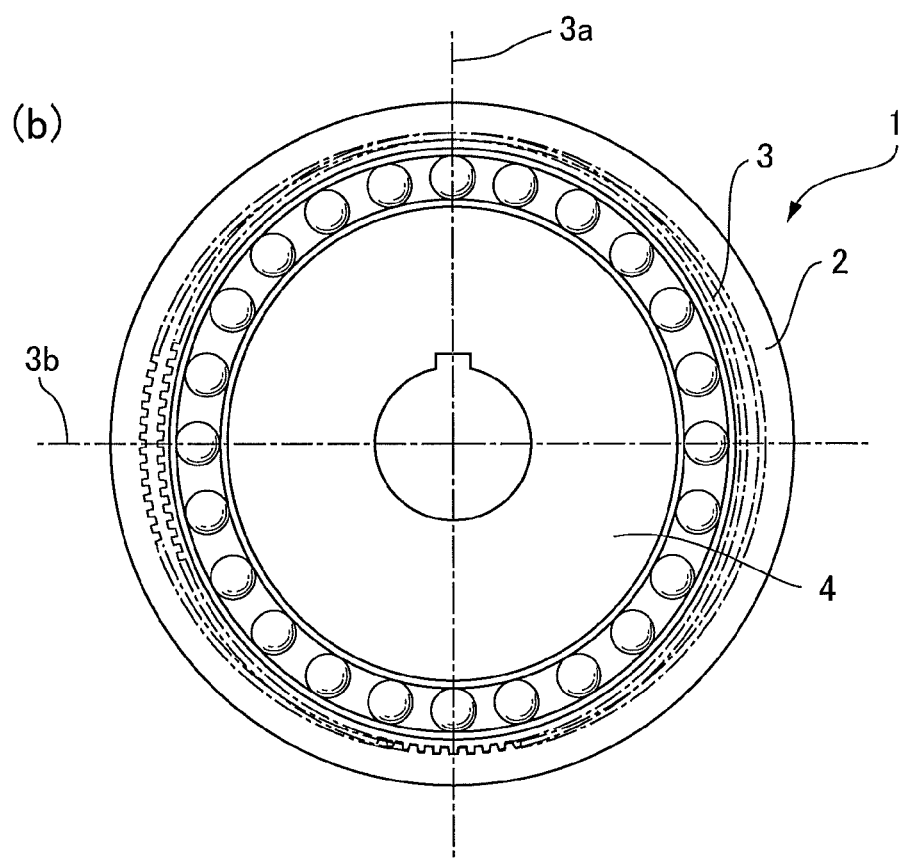
Figure 2:
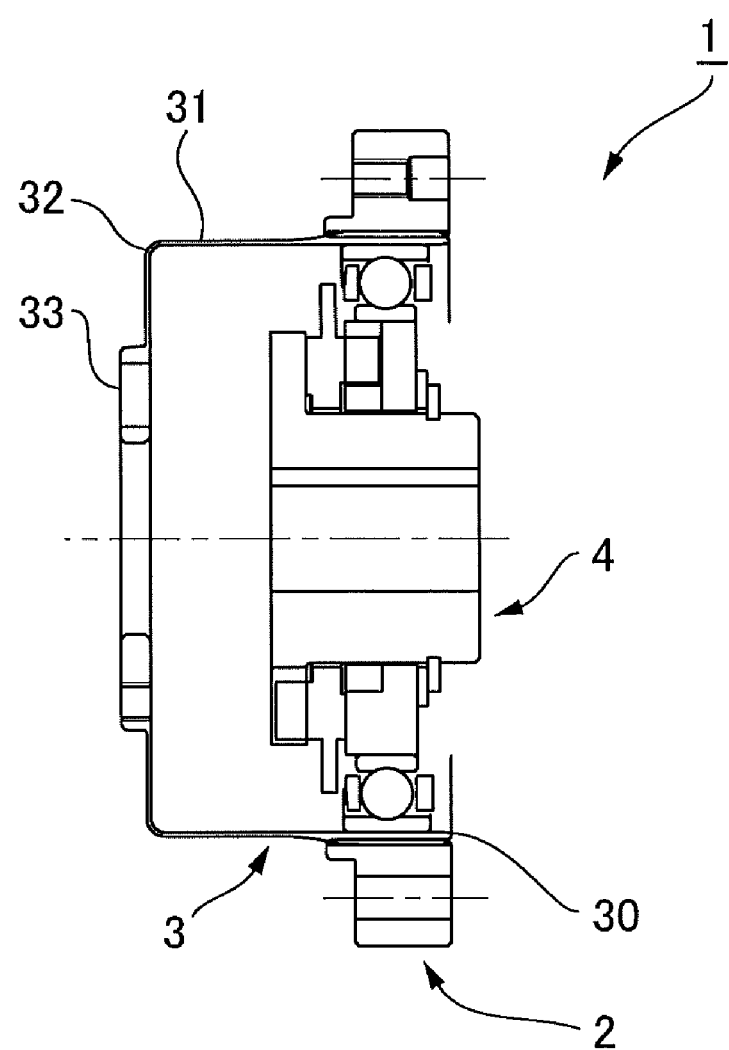
FIG. 2 is a longitudinal sectional view of the wave gear device of FIG. 1.

FIGS. 1 and 2 are a longitudinal sectional view and a schematic front view showing a cup-type wave gear device. The cup-type wave gear device 1 comprises a rigid circular spline 2, a cup-shaped flexspline 3 disposed inside the circular spline, and an elliptical wave generator 4 mounted inside the flexspline. The cup-shaped flexspline 3 is bent into an elliptical shape by the wave generator 4. When the wave generator 4 rotates, the positions where the two splines are enmeshed move in a circumferential direction, and relative rotation is generated between the two splines 2, 3 in accordance with the difference in the number of teeth between the splines 2, 3.

Figure 3:
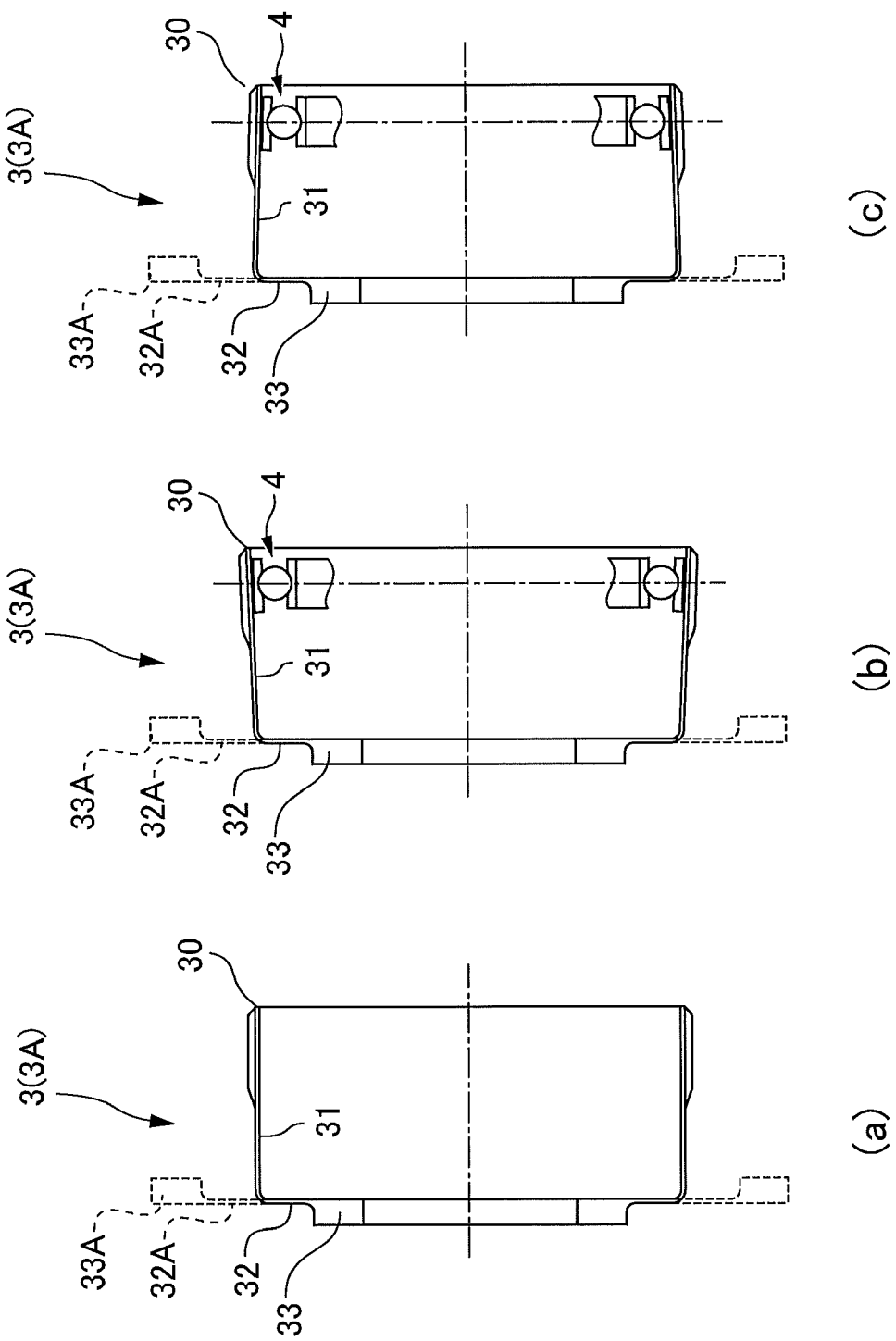
FIG. 3 is a descriptive view showing coning in the cup-shaped flexspline of FIG. 1.

FIG. 3 is an explanatory view showing a state in which the flexspline 3 is bent by coning, wherein (a) is a longitudinal sectional view showing the state before deformation, (b) is a longitudinal sectional view showing the bent state in a cross-section containing the major axis 3a of the elliptical shape when the flexspline is bent into an elliptical shape by the wave generator 4, and (c) is a longitudinal sectional view showing the bent state in a cross-section containing the minor axis 3b of the elliptical shape when the flexspline is bent into the elliptical shape.

As can be seen from FIG. 3(b), the amount of the coning-induced outward radial bending in the flexspline 3 along the major axis of the elliptical shape reaches a maximum at an open end 30 of a cylindrical body 31, and gradually decreases in proportion to the distance from the open end 30 in the direction toward a diaphragm 32, which is contiguous with the rear end of the cylindrical body 31. As can be seen from FIG. 3(c), the amount of bending along the minor axis of the elliptical shape gradually decreases inward in the radial direction. A disc-shaped, rigid boss 33 is integrally formed on the inner circumferential edge of the diaphragm 32.

In the case of a "silk hat"-shaped flexspline 3A, the diaphragm 32A widens outward in the radial direction, as shown by the broken line, and the disc-shaped rigid boss 33A is integrally formed on the outer circumferential edge of the diaphragm. Coning is generated in the flexspline 3A in this case also.

Figure 4:
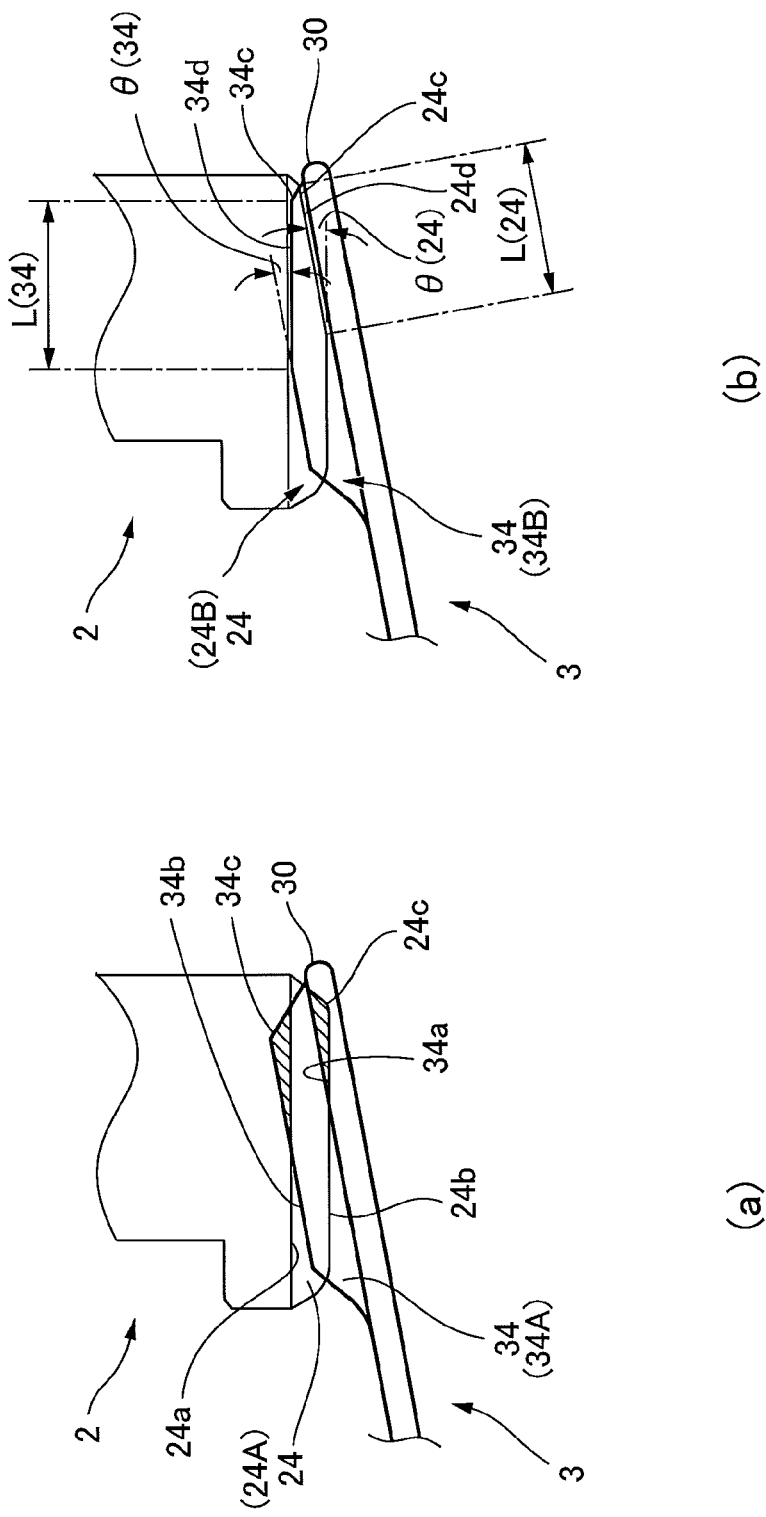
FIG. 4(a) is an explanatory view showing a state in which interference occurs between the two splines due to coning, and (b) is an explanatory view showing a tooth profile to which the present invention is applied.

FIG. 4 is an explanatory view showing the coning-induced interference in the mutual meshing of the two splines 2, 3. Provided that the internal teeth 24 of the circular spline 2 has a second basic tooth profile 24A designed so that it has the bottom land 24a and the top land 24b parallel to each other and that it is an involute tooth profile or a straight-line tooth profile whose depth remains constant along the entire tooth trace direction. Similarly, provided that the external teeth 34 of the flexspline 3 has a first basic tooth profile 34A designed so that it has the bottom land 34a and the top land 34b parallel to each other and that it is an involute tooth profile or a straight-line tooth profile whose depth remains constant along the entire tooth trace direction. In this case, coning causes portions of the internal teeth 24 and the external teeth 34 near the tooth trace ends 34c, 24c thereof at the open end 30 of the flexspline 3 to interfere with the bottom lands 34a, 24a of the other teeth. The portions where the interference occurs are shown by hatching in the drawing.

In view of this, a second modified tooth profile 24B is used in the circular spline 2 of the present example. The second modified profile 24B is obtained by forming a smooth second tapered surface 24*d* in the top land area of the tooth trace end part near the open end 30 in the second basic internal teeth profile 24A, as shown in FIG. 4(*b*). Similarly, a first modified profile 34B is used in the flexspline 3, the first modified profile 34B being obtained by forming a smooth first tapered surface 34*d* in the top land area of the tooth trace end part near the open end 30 in the first basic external teeth profile 34A. Here, the angles (24), (34) of the first and second tapered surfaces 34*d*,24*d*, and the lengths L(34), L(24) of the tapered surfaces 34*d*, 24*d* from the tooth trace ends 34*c*, 24*c* in the tooth trace direction, are set so as to be able to prevent interference caused by coning.

Figure 5:
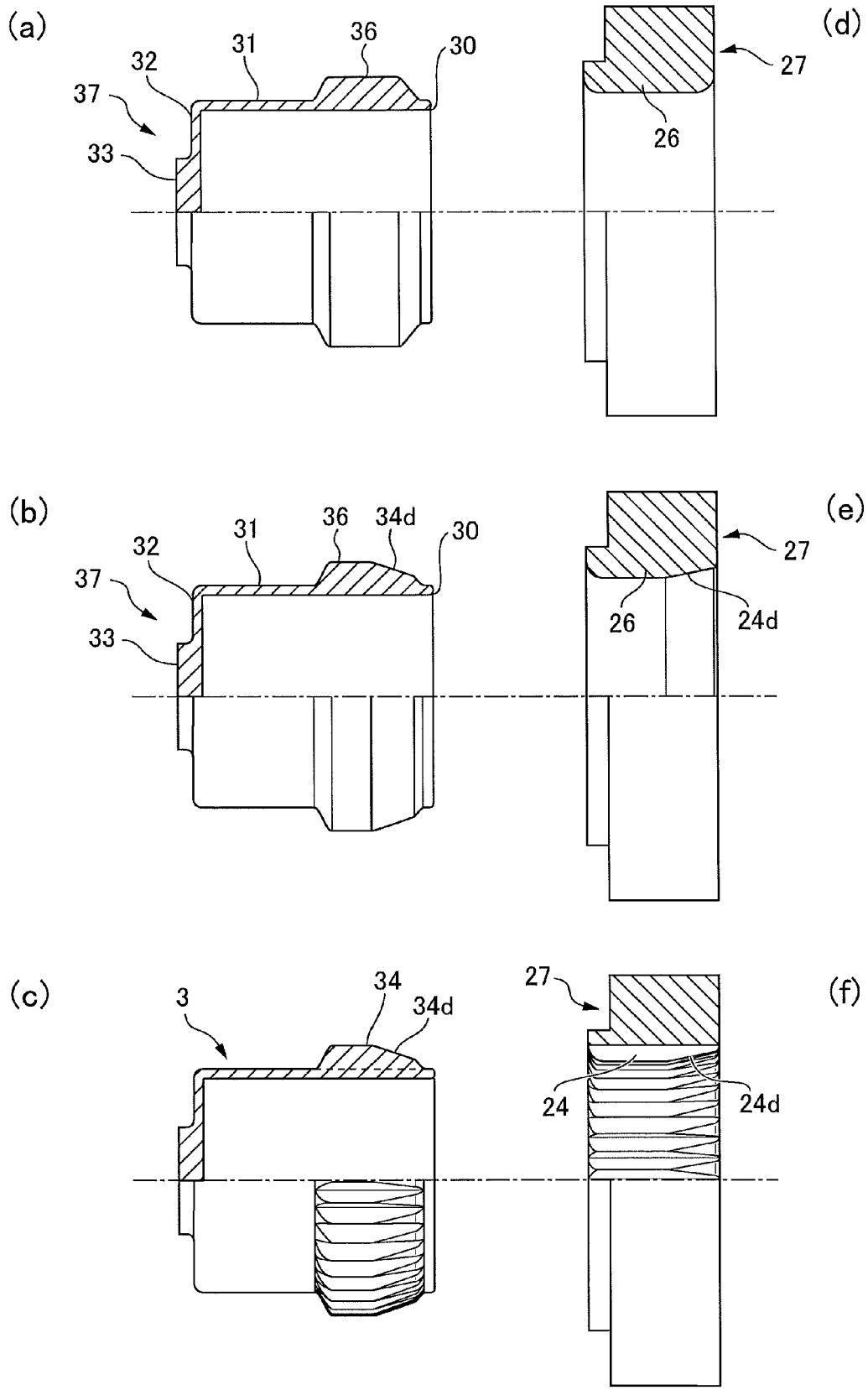
FIGS. 5(a) to (f) are explanatory views showing the gear machining steps for both of the splines.

FIGS. 5(*a*) to 5(*f*) are explanatory views showing a method for machining the flexspline 3 formed with the external teeth 34. A flexspline blank 37 is first manufactured, as shown in FIG. 5(*a*). The blank 37 has the cylindrical body 31, the diaphragm 32, the boss 33, and an external-tooth forming part 36 where the external teeth are formed. A tapering process is next performed on the part of the flexspline blank 37 that serves as the top land 34*b* of the external teeth on the part 36 where the external teeth are formed near the open end of the blank, and a smooth tapered surface 34*d* having a fixed angle is formed, as shown in FIG. 5(*b*). The tapered part 36 where the external teeth are formed on the blank 37 is subsequently subjected to gear cutting by linear machining using a typical gear machining mechanism to form the tapered external teeth 34, as shown in FIG. 5(*c*). A surface treatment or another predetermined post-treatment is then carried out.

The same processes are performed on the circular spline 2 having the internal teeth 24. An annular blank 27 for the circular spline is manufactured, the blank being provided with the part 26 where the internal teeth are formed on the inner circumferential surface part, as shown in FIG. 5(*d*). The top land area is then tapered along the tooth trace direction positioned near the open end of the flexspline on the part 26 of the circular spline blank 27 where the internal teeth are formed, resulting in a smooth tapered surface 24*d* having a fixed angle, as shown in FIG. 5(*e*). The tapered part 26 where the internal teeth are formed is subsequently subjected to gear cutting by linear machining to form the tapered internal teeth 24, as shown in FIG. 5(*f*).

The above example was described with reference to a cup-type wave gear device, but the same tooth profile as in the above example can also be used for the internal teeth of the circular spline and the external teeth of the flexspline in a "silk hat"-type wave gear device.

The invention claimed is:

1. A wave gear device, comprising:
a rigid circular spline having internal teeth formed on a circular inner circumferential surface thereof;
a flexspline disposed inside the circular spline and provided with a cylindrical body capable of bending in a radial direction, a diaphragm having one end contiguous with a rear end of the cylindrical body, a rigid boss formed on another end of the diaphragm, and external teeth formed on an external circumferential part near an open end of the cylindrical body; and
a wave generator for bending the cylindrical body of the flexspline into an elliptical shape, causing the external teeth to partially mesh with the internal teeth of the circular spline, causing positions at which both of the sets of teeth are enmeshed to move in a circumferential direction, and generating relative rotation between both of the splines in accordance with a difference in the number of teeth between the two sets of teeth;
wherein the amount of bending in a radial direction at a position along a major axis of the elliptical shape in the cylindrical body bent into an elliptical shape by the wave generator gradually increases in a direction from the rear end to the open end;
wherein the tooth profile of the external teeth is defined by a first modified tooth profile obtained by modifying a first basic tooth profile,
the first basic tooth profile has a bottom land and a top land parallel to each other so that a tooth depth thereof is kept constant, and
the first modified tooth profile is provided with a first tapered surface in a top land area near a tooth trace end of the first basic tooth profile located on an open end side of the flexspline so that a tooth depth thereof gradually decreases toward an open end of the flexspline along a tooth trace direction thereof;
wherein the tooth profile of the internal teeth is defined by a second modified tooth profile obtained by modifying a second basic tooth profile,
the second basic tooth profile has a bottom land and a top land parallel to each other so that a tooth depth thereof is kept constant, and
the second modified tooth profile is provided with a second tapered surface in a top land area near a tooth trace end of the second basic tooth profile located on a side of an open end of the flexspline so that a tooth depth thereof gradually decreases toward an open end of the flexspline along a tooth trace direction thereof; and,
wherein respective angles of the first and second tapered surfaces formed on the external teeth and the internal teeth, and respective ranges in which the first and second tapered surfaces are formed in the tooth trace direction, are set so that the top land of one set of teeth does not interfere with the bottom land of the other set of teeth in the internal teeth and external teeth that have been brought to an enmeshed state by the wave generator.

2. A wave gear device according to claim 1, wherein the first and second basic tooth profiles are a straight-line profile or an involute profile.

3. A method for machining the flexspline used in the wave gear device of claim 1, comprising the steps of:
producing a flexspline blank having the cylindrical body, the diaphragm, the boss, and an external-tooth forming part;
performing a tapering process on a part of the external-tooth forming part of the flexspline blank that serves as a top land portion of the external teeth near the open end of the flexspline; and
subjecting the external-tooth forming part after the tapering process to gear cutting by linear machining, so that the external teeth having the first modified tooth profile is obtained.

4. A method for machining the circular spline used in the wave gear device of claim 1, comprising the steps of:
producing an annular circular spline blank having an internal-tooth forming portion on an inner circumferential surface thereof;
performing a tapering process on a part of the internal-tooth forming part of the annular circular spline blank that serves as a top land portion of the internal teeth located on the side of the open end of the flexspline; and subjecting the internal-tooth forming part after the tapering process to gear cutting by linear machining, so that the internal teeth having the second modified tooth profile is obtained.

5. A method for machining the flexspline used in the wave gear device of claim 2, comprising the steps of:
  producing a flexspline blank having the cylindrical body, the diaphragm, the boss, and an external-tooth forming part;
  performing a tapering process on a part of the external-tooth forming part of the flexspline blank that serves as a top land portion of the external teeth near the open end of the flexspline; and
  subjecting the external-tooth forming part after the tapering process to gear cutting by linear machining, so that the external teeth having the first modified tooth profile is obtained.

6. A method for machining the circular spline used in the wave gear device of claim 2, comprising the steps of:
  producing an annular circular spline blank having an internal-tooth forming portion on an inner circumferential surface thereof;
  performing a tapering process on a part of the internal-tooth forming part of the annular circular spline blank that serves as a top land portion of the internal teeth located on the side of the open end of the flexspline; and
  subjecting the internal-tooth forming part after the tapering process to gear cutting by linear machining, so that the internal teeth having the second modified tooth profile is obtained.

* * * * *